(12) United States Patent
Mäkipää et al.

(10) Patent No.: US 7,599,689 B2
(45) Date of Patent: Oct. 6, 2009

(54) SYSTEM AND METHOD FOR BOOKMARKING RADIO STATIONS AND ASSOCIATED INTERNET ADDRESSES

(75) Inventors: Mikko Mäkipää, Helsinki (FI); Toni Kopra, Sööritie (FI); Hemant Madan, Espoo (FI); Akseli Anttila, Helsinki (FI); Petteri J. Saarinen, Helsinki (FI); Barbara Heikkinen, Espoo (FI); Oleg Beletski, Helsinki (FI)

(73) Assignee: Nokia Corporation, Espoo (FI)

( * ) Notice: Subject to any disclaimer, the term of this patent is extended or adjusted under 35 U.S.C. 154(b) by 642 days.

(21) Appl. No.: 10/126,623

(22) Filed: Apr. 22, 2002

(65) Prior Publication Data

US 2004/0203729 A1  Oct. 14, 2004

(51) Int. Cl.
    *H04Q 7/20* (2006.01)
(52) U.S. Cl. .............. 455/426.1; 455/186.1; 455/566
(58) Field of Classification Search .......... 455/456, 455/414.1, 556.2, 3.03, 450, 567, 418, 131, 455/141, 142, 145, 3.01, 3.06, 77, 503, 150.1, 455/154.1, 154.2, 3.04, 186.1, 566; 370/401, 370/402, 404, 352
See application file for complete search history.

(56) References Cited

U.S. PATENT DOCUMENTS

| | | | |
|---|---|---|---|
| 5,128,981 A * | 7/1992 | Tsukamoto et al. | 455/450 |
| 5,852,610 A * | 12/1998 | Olaniyan | 370/486 |
| 5,907,322 A | 5/1999 | Kelly et al. | |
| 6,035,202 A | 3/2000 | Camp, Jr. | |
| 6,097,441 A | 8/2000 | Allport | |
| 6,182,113 B1 | 1/2001 | Narayanaswami | |
| 6,314,094 B1 * | 11/2001 | Boys | 370/352 |
| 6,341,133 B1 * | 1/2002 | Kawamoto et al. | 370/401 |
| 6,507,727 B1 * | 1/2003 | Henrick | 455/3.06 |
| 6,560,640 B2 | 5/2003 | Smethers | |

(Continued)

FOREIGN PATENT DOCUMENTS

EP   0797342 A1   9/1997

(Continued)

OTHER PUBLICATIONS

"Give Me SmartRadio Now", http://smartradio.mediacorpradio.com/Stations/radio_stations.htm, Feb. 20, 2002.

(Continued)

*Primary Examiner*—Congvan Tran
(74) *Attorney, Agent, or Firm*—Ditthavong Mori & Steiner, P.C.

(57) ABSTRACT

A system and method is provided for permitting a data terminal to connect to a broadcast station web site and to receive a broadcast station broadcast in response to selection of a bookmark. Selection of the bookmark results in a tuner on the data terminal being tuned to receive a broadcast while the data terminal substantially simultaneously connects to a web site for the broadcast station. Broadcast frequency information and web site address information for the bookmark may be stored on the data terminal, or such information may be stored remotely, such as on a station id server in communication with the data terminal. The bookmark may be programmed by the user and may represent different broadcast stations according to parameters.

40 Claims, 8 Drawing Sheets

U.S. PATENT DOCUMENTS

| | | |
|---|---|---|
| 6,578,047 B1 | 6/2003 | Deguchi |
| 6,618,585 B1 * | 9/2003 | Robinson .................... 455/3.02 |
| 6,628,928 B1 * | 9/2003 | Crosby et al. ................. 455/77 |
| 6,650,877 B1 * | 11/2003 | Tarbouriech et al. ..... 455/186.1 |
| 6,657,989 B1 | 12/2003 | Hilsenrath |
| 6,970,915 B1 * | 11/2005 | Partovi et al. ............... 709/217 |
| 7,062,222 B2 * | 6/2006 | Boda et al. ................. 455/3.05 |
| 7,076,202 B1 * | 7/2006 | Billmaier ................... 455/3.04 |
| 7,127,454 B2 * | 10/2006 | Deguchi ........................ 707/3 |
| 2001/0043684 A1 * | 11/2001 | Guedalia et al. ......... 379/88.17 |
| 2002/0010789 A1 | 1/2002 | Lord |
| 2002/0016165 A1 * | 2/2002 | Davies et al. ............... 455/414 |
| 2002/0068538 A1 * | 6/2002 | Hitomi et al. ............ 455/186.1 |
| 2002/0081968 A1 * | 6/2002 | Russell ..................... 455/3.06 |
| 2002/0102954 A1 * | 8/2002 | Kaneko ..................... 455/142 |
| 2002/0111134 A1 * | 8/2002 | Salurso et al. ............. 455/3.06 |
| 2002/0152267 A1 | 10/2002 | Lennon |
| 2002/0174431 A1 | 11/2002 | Bowman et al. |
| 2003/0005433 A1 | 1/2003 | Janik et al. |
| 2003/0030749 A1 * | 2/2003 | Kondo et al. ................. 348/458 |
| 2003/0040302 A1 * | 2/2003 | Okada ........................ 455/414 |
| 2003/0041334 A1 | 2/2003 | Lu |
| 2003/0060157 A1 | 3/2003 | Henrick |
| 2003/0061110 A1 | 3/2003 | Bodin |
| 2003/0114145 A1 * | 6/2003 | Boda et al. .................. 455/412 |
| 2003/0208762 A1 * | 11/2003 | Hanai et al. ................... 725/58 |
| 2004/0043758 A1 * | 3/2004 | Sorvari et al. ............. 455/414.1 |
| 2004/0049779 A1 | 3/2004 | Sjoblom et al. |
| 2004/0192302 A1 * | 9/2004 | Achour et al. ........... 455/435.1 |
| 2005/0020223 A1 | 1/2005 | Ellis et al. |
| 2005/0020238 A1 | 1/2005 | Eastman et al. |
| 2005/0170799 A1 | 8/2005 | Strandberg et al. |

FOREIGN PATENT DOCUMENTS

| | | |
|---|---|---|
| EP | 1 022 915 A1 | 7/2000 |
| EP | 1035674 | 9/2000 |
| JP | 59230330 | 12/1984 |
| JP | 10145687 | 5/1998 |
| JP | 11275537 | 10/1999 |
| JP | 2000339345 | 12/2000 |
| JP | 2001264089 | 9/2001 |
| JP | 2002063104 | 2/2002 |
| JP | 2002091652 | 3/2002 |
| JP | 2002344943 | 11/2002 |
| JP | 2003224535 | 8/2003 |
| JP | 2004032650 | 1/2004 |
| KR | 20000017754 | 4/2000 |
| KR | 2002-44556 | 6/2002 |
| WO | WO 01/28260 A2 | 4/2001 |
| WO | 0135658 | 5/2001 |
| WO | WO 02/017117 A2 | 2/2002 |

OTHER PUBLICATIONS

Supplementary European Search Report dated Feb. 7, 2006.
Korean Office Action dated Sep. 26, 2006.
Korean Office Action dated Mar. 28, 2006.
Office Action dated May 3, 2007 (U.S. Appl. No. 10/319,475).
Japanese Office Action dated Oct. 2, 2007.
Chinese Office Action dated Dec. 7, 2007.

* cited by examiner

SYSTEM AND METHOD FOR BOOKMARKING RADIO STATIONS AND ASSOCIATED INTERNET ADDRESSES

FIELD OF THE INVENTION

This invention relates generally to mobile terminal devices. More particularly, the present invention relates to a device having bookmark functionality for radio tuning capabilities and Internet website addressing.

BACKGROUND OF THE INVENTION

Preset radio buttons are common on conventional radios and are well known for use as programmable shortcuts to frequencies associated with favorite radio stations. Mobile data terminal devices that are capable of receiving FM radio transmissions are also known. Like conventional radios, these devices typically include options for storing frequencies associated with favorite radio stations and for quickly tuning to those frequencies. Unlike convention radios, however, many of these mobile devices are connected to data networks, which in turn provide access to the Internet through the device. Because such devices may simultaneously receive FM radio stations and browse the Internet, it is often desirable when listening to the radio to also view the content of a web page associated with the radio station. The content of such a web page may supplement the radio broadcast with further details and information related to the broadcast, or provide additional information such as local news and weather.

These mobile terminal devices, however, do not typically include a means for accessing, in parallel, Internet media and FM broadcast media associated with a radio station. To view web page content for a radio station while listening to the radio station broadcast, a user must typically tune to the radio station of interest, and independently navigate the Internet to find a web site associated with the radio station. The user may navigate to the radio station web site through the use of a pre-selected bookmark for the web site, and may tune to the radio broadcast with a radio station bookmark; however, the user nonetheless independently tunes the radio and navigates the web. The use of a preset radio button along with a web site bookmark requires the user to employ separate steps for controlling access to each media source. Such a process is time-consuming and more complex than necessary. To address this shortcoming in such mobile terminal devices, solutions have been proposed.

One proposed solution includes the use of digital radio services. Digital radio consists of radio broadcasts of data rather than analog transmissions. Because the data transmitted may include various types of information along with audio information, a mobile terminal device receiving digital radio broadcasts may view content associated with the audio radio broadcast. Radio stations broadcasting digital radio, therefore, can transmit information, such as traffic, weather, and advertising information, simultaneous with the audio broadcast. Unless the mobile terminal device is in communication with the Internet, however, the user is limited to one-way communication with the radio station. In other words, the user may be able to view information sent by the radio station, and may even be able to navigate through the information, but the user is unable to request different information or to interact with the radio station in two-way communication.

SUMMARY OF THE INVENTION

The present invention provides a system and method for tuning a mobile terminal device to receive a media broadcast (e.g. a radio or television broadcast) while simultaneously navigating the Internet to interact with a web site associated with the media station. Bookmarks on such a device can have combined functionality, such that selection of a radio bookmark results in the device being tuned to a radio station associated with the bookmark and, at substantially the same time, connecting to a web site associated with the radio station. Accordingly, the usability of the device is greatly improved.

In one embodiment, the present invention includes a mobile terminal device in communication with a data network that is capable of receiving radio broadcasts. The device generally includes a display screen, a storage medium, a keypad, a processor, a radio tuner, an antenna, and communication hardware. The processor is adapted to perform steps according to instructions stored in the storage medium. In one aspect of the invention, the device is adapted to receive analog FM radio media, and in another aspect of the invention, the device is adapted to receive digital radio broadcasts.

Radio bookmarks are stored in the storage medium and may be programmed and selected by a user. The bookmarks generally include handles or identifiers that point to various resources such as a file, an Internet protocol (IP) address, a uniform resource locator (URL), and the like. The bookmarks may also include parameters that further define the bookmarks. The radio bookmarks generally have combined functionality in that selection of a bookmark results in selection of both a network address and a radio frequency for a radio station associated with the bookmark. Accordingly, a user simply selects a radio bookmark in order to listen to the associated radio station broadcast and to view Internet content associated with the broadcast. The user, therefore, does not need to search for both a radio station and its web site.

In other embodiments of the invention, computer-executable instructions for implementing the disclosed methods are stored on computer-readable media. Additionally, other embodiments may include reception of different broadcasts, such as television, satellite and other broadcasts. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE INVENTION

Figure 1:
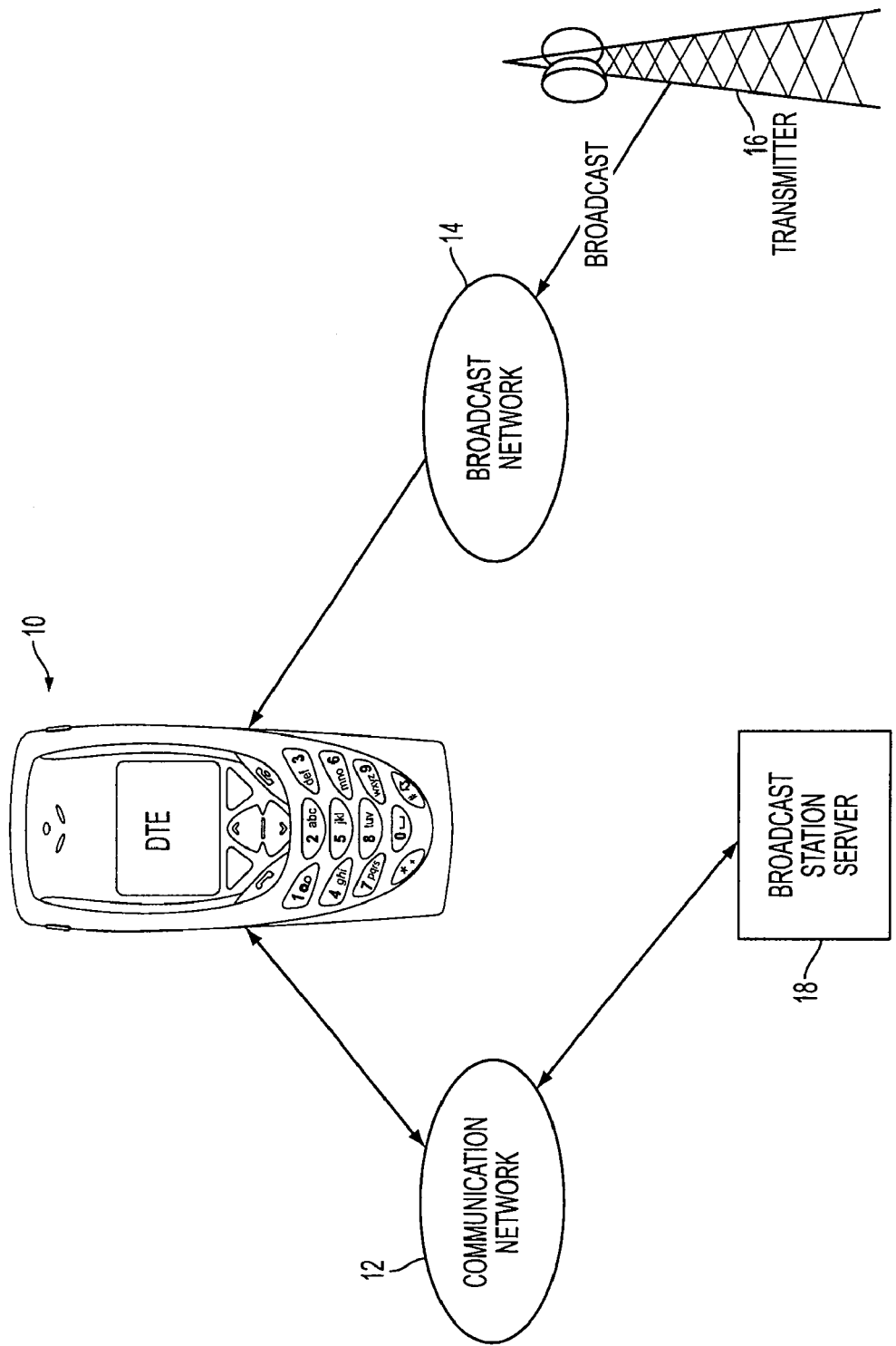
FIG. 1 shows an exemplary layout of a system according to the present invention including a mobile terminal device adapted to receive radio broadcasts and that is in communication with a network.
Figure 2:
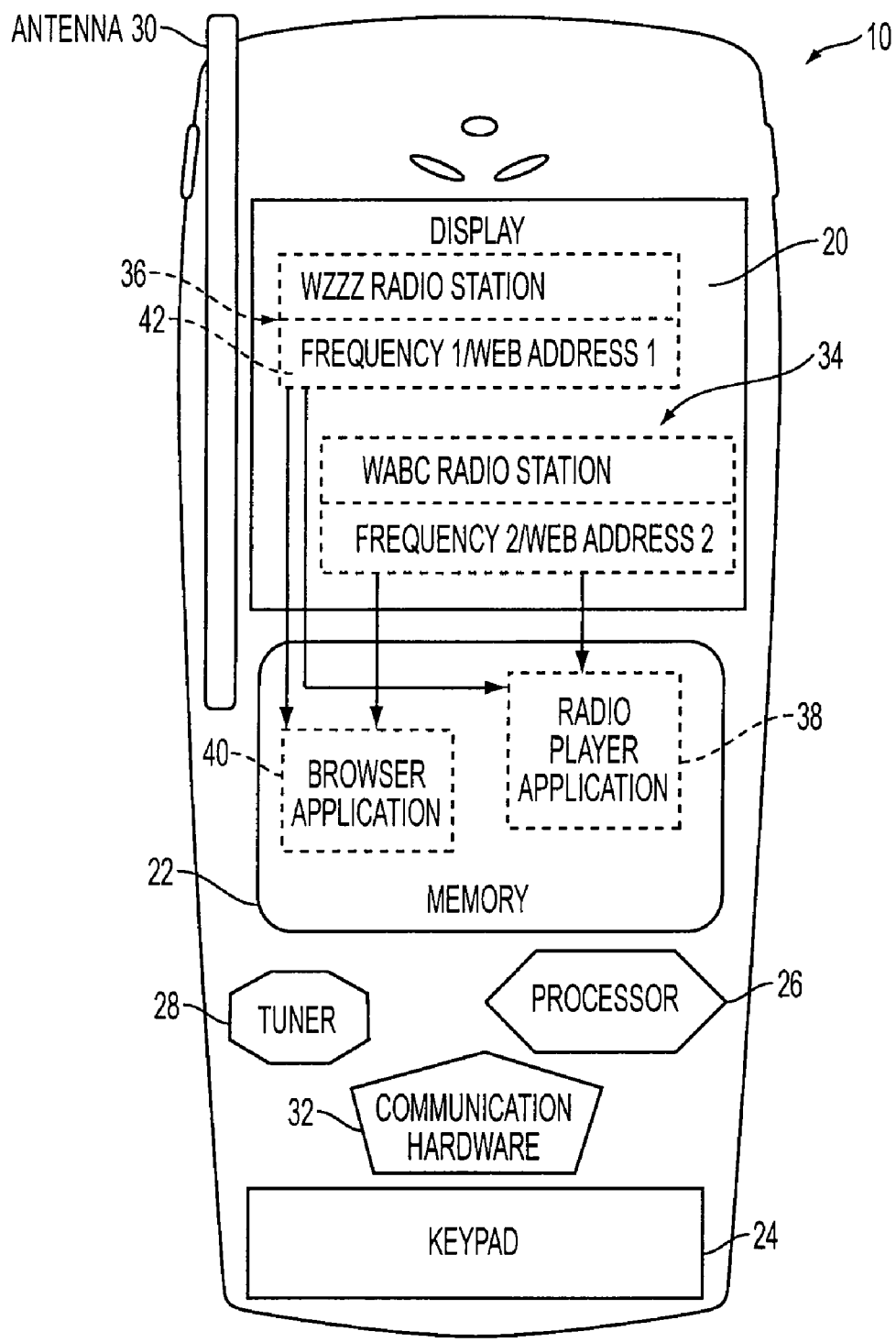
FIG. 2 shows a functional block diagram of the device of FIG. 1.

The invention may be embodied in various forms. As shown in FIGS. 1 and 2, one embodiment according to the present invention includes a mobile data terminal device (DTE) 10 in communication with a data communication network 12 and a broadcast network 14. The broadcast network may include radio waves associated with a radio station (not shown) that are transmitted from a transmitter 16, or may include television, satellite or other types of digital or analog broadcasts. The data communication network 12 may communicate with a broadcast station server 18 also associated the radio station (not shown). The DTE 10 generally includes a display screen 20, memory 22, a keypad 24, a processor 26, a radio tuner 28, an antenna 30, and communication hardware 32. As is known in the art, the processor 26 performs steps according to instructions stored in the memory 22 and generally interacts with other components of the DTE 10. The display screen 20 displays images and the keypad 24 is adapted to receive inputs from an operator.

The antenna 30 may receive radio waves in the radio broadcast network 14 transmitted by the transmitter 16, as is known in the art. The radio tuner 28 is rear connected to the antenna 30 and is adapted to tune, demodulate and amplify selected frequencies of radio waves received by antenna 30, such as those transmitted from transmitter 16. The communication hardware 32 is adapted to receive and modulate or demodulate wireless communication signals, such as microwaves, sent or received from the DTE 10, as is known in the art. Thus, the device 10 according to one embodiment comprises a mobile terminal device that is capable of receiving radio station broadcasts while simultaneously communicating with a data network. The device of the present invention, however, is not limited to any particular embodiment of a device, provided the device has both data connectivity and broadcast reception capabilities.

Further, the device of present invention is not limited to any particular embodiment for enabling data connectivity or broadcast reception. For example, the DTE 10 may use a circuit switched connection for data connectivity, such as a second-generation wireless system using TDMA (Time Division Multiple Access), CDMA (Code Division Multiple Access), GSM (Global System for Mobile Communications), or other such access systems. In other examples, DTE 10 may use a packet based access system, such as GPRS (General Packet Radio Service) over a GSM network, or short range connectivity systems such as WLANs (Wireless local area networks) or Bluetooth®. With regard to broadcast tuning, DTE 10 may receive, for example, analog radio transmissions, digital radio transmissions, satellite radio transmissions, analog television transmissions, digital television transmissions, or other such broadcasts.

According to one embodiment, radio bookmarks 34 are stored in the memory 22, and may be programmed and selected by the user. The radio bookmarks 34 generally include handles or identifiers pointing to various resources such as files, Internet protocol (IP) addresses, uniform resource locators (URL), and the like. The bookmarks may also include parameters that further define the bookmarks. The radio bookmarks 34 generally have combined functionality such that selection of a bookmark 34 results in selection of both a network address and a radio frequency, both of which are associated with a particular radio station. Accordingly, a user simply selects a radio bookmark 34 in order to tune the tuner 28 to frequencies of radio waves for a radio station, such as those transmitted by transmitter 16, and to substantially simultaneously connect the device 10 with a server located at a network address associated with the radio station, such as broadcast station server 18.

For example, suppose that the radio transmitter 16 transmits FM radio waves for a certain radio station (not shown), for instance a radio station having the call sign WZZZ, and that the broadcast station server 18 is operated by radio station WZZZ. Suppose also that radio station WZZZ maintains a web site on broadcast station server 18 that provides information supplemental to its FM radio broadcast. Suppose also that the radio station is a favorite radio station for the user and that the user has programmed bookmark one 36 to include frequency information for the radio station broadcast and the network address of the radio server 18. As such, in order to listen to the radio broadcast and to view web content for the radio station, the user merely needs to select bookmark one 36. The user may select bookmark one 36 using keypad 24 to select a representation of bookmark one 36 shown on the display 20, as is known in the art for graphical user interfaces. Alternatively, the user may select a key on keypad 24 associated with bookmark one 36, or use other such methods to choose a bookmark.

Figure 3:
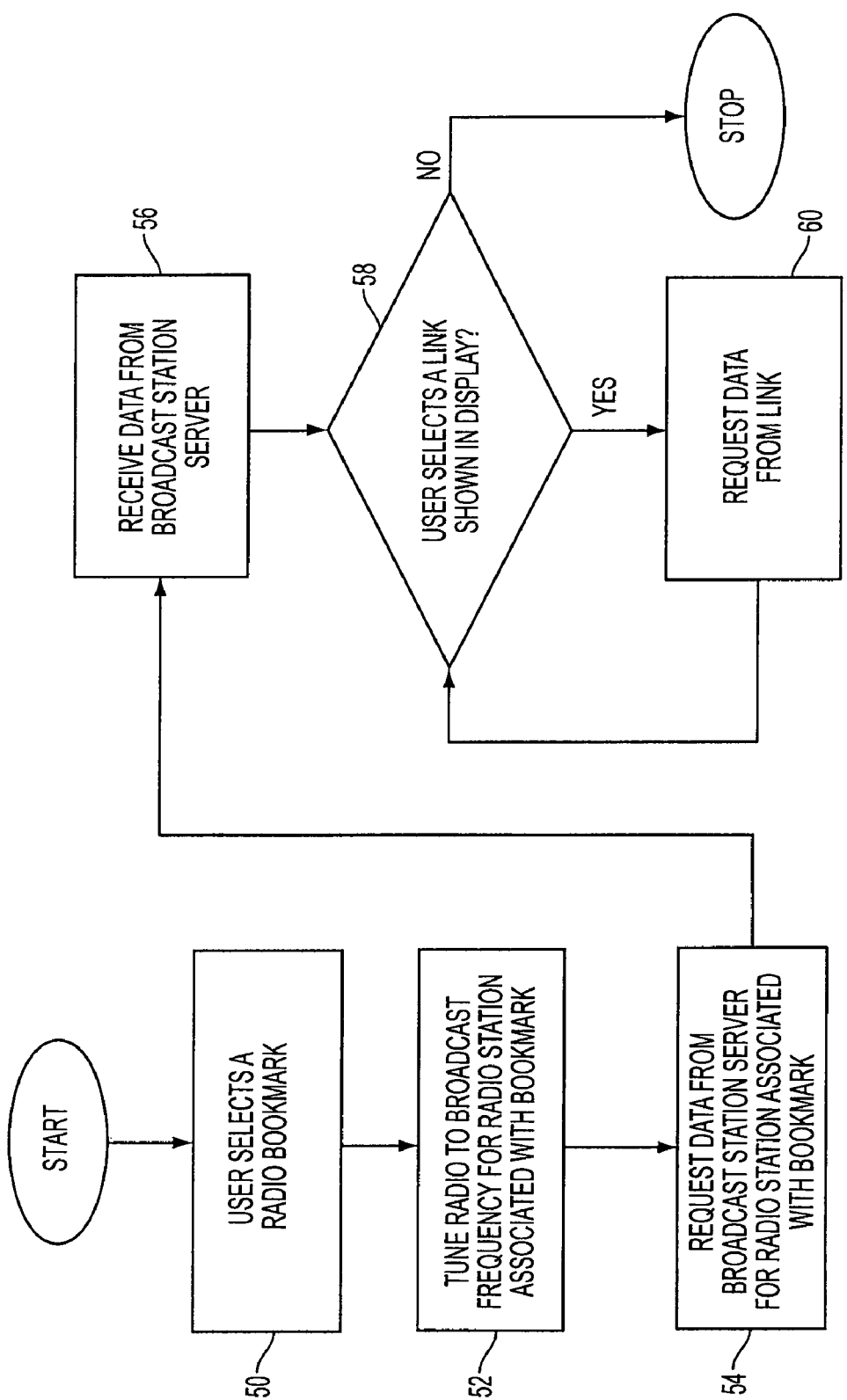
FIG. 3 shows a flow diagram for operation of the system of FIG. 1 in accordance with selection of a radio bookmark of the present invention.

Referring now to FIG. 3, when the user selects bookmark one 36, the processor follows instructions stored in the memory 22 and performs associated steps. Accordingly, the processor 26 detects 40 the user's selection of bookmark one 36. Bookmark one 36 points to both a radio player application 38 stored in the memory 22 and a browser application 40, such as a wireless markup language (WML) application. Bookmark one 36 also includes parameters 42 that include frequency information for radio station WZZZ and web site address information. Parameters generally include information or data that further define one or more bookmarks or that affect performance of the DTE 10 based on selection of associated bookmarks. Parameters may include frequency information and network address information, as well as other types of information, some examples of which are discussed below.

Selection of bookmark one 36 invokes both radio player application 38 and browser application 40, and provides information in parameters 42 to the respective applications 38, 40. According to the radio player application, the processor 26 tunes 52 the radio tuner 28 to the frequency parameter 42 for bookmark one 36 for receiving the associated radio station broadcast. According to the browser application 40, the tuner sends 54 a request to the network address of broadcast station server 18 requesting data for the radio station website. The step of sending 54 a request may include opening a communication channel using communication hardware 32, if it is not already open. For example, if communication with communication network 12 is via a circuit switched connection like GSM, then the connection is open for the time of service and is closed when service use ends. Thus, a communication channel may need to be opened prior to sending 54 any requests. This may also be applicable for a packet switched connection, such as GPRS, if the connection has not yet been established.

In response to sending 54 a request, the broadcast station server 18 returns data to the device 10 and the processor 26 receives 56 the data. At this point, a session may be established with broadcast station server 18, which is managed by the browser application 40 and the server 18. In accordance with one embodiment, when data is received, the processor displays a web page (not shown) for the radio station, which includes links that the user may select. In accordance with another embodiment, update data is frequently received to update the web page. In this way, regardless of user input, information displayed on DTE 10 is substantially synchronized with the radio broadcast to reflect current content of the broadcast, such as the name of a song being played or to provide input opportunities, such as for a quiz or contest being broadcast on the station. When the processor detects that the user selects 58 a link shown in the display 20, the processor 26 directs the device 10 to request 60 data from broadcast station server 18 for that link. Accordingly, by simply selecting bookmark one 36, the user may listen to the radio station broadcast, browse the radio station web site, and thereby receive information supplemental to the radio broadcast.

In another embodiment of the invention, the frequency and IP address parameter information may not be stored on the device, but may be stored remotely, such as on a server in communication with network 12. This provides many benefits, such as allowing the user to program radio bookmarks for different radio stations depending on other programmed parameters. For example, the user may desire bookmark one 36 to represent the strongest classical music radio station for the user's present location. This may be particularly beneficial for a user who travels frequently. The user's present location is an example of an additional parameter that may be useful for adding flexibility to the use of radio bookmarks. The user's location may be automatically determined, for example, using global positioning system (GPS) technology.

In another example, a parameter could be a unique apparatus id associated with the DTE 10, such that the radio frequency and IP address for a particular bookmark are related to the apparatus id. Another example of a parameter is a unique user id, wherein the radio bookmarks on a device are adapted according to a unique user id, such as username and password. Multiple parameters can add even further flexibility. In a further example, the bookmarks 34 on a particular device 10 may represent different radio stations for different users of the device. As such, a user may need to input a unique user id, which may be manually entered as a username and password, or entered through the insertion of an identification module in to the device, or other like means. Accordingly, the parameter may be a unique user id and the bookmarks may represent radio stations or preferences for radio stations according to individual users' programming.

In further examples, parameters may include preferences established by the user, such that a bookmark represents different stations based on the time of day, location, or other factors. For example, a user may prefer that bookmark one 36 refer to travel information during rush hour, rock music during the daytime, and classical music in the evening. In another example, a user profile may be established based on statistical information of the user provided to a bookmark web site that creates bookmarks. The bookmark website may forward bookmarks to DTE 10 that the user could choose to accept. In a different example, a bookmark could represent a particular station, and based on a location parameter for the user, a different broadcast frequency may be applicable for that station. In an example with a radio station chain, the bookmark could represent the chain, and based on a user location parameter, a frequency for a station within the chain could be appropriate.

The bookmarks 34 and their parameters may be programmed according to software stored on the DTE 10 using keypad 24, or through an interface with another computer such as through a universal serial bus (USB) connection or network communications, or other known methods for programming mobile data terminals. In other examples, the bookmarks 34 and their parameters may be programmed remotely and sent to DTE 10 over the air (OTA). In such an example, a friend of the user may send a bookmark to the user as a recommendation for a broadcast station. This could be accomplished using a short messaging service (SMS), such as Nokia Smart Messaging®. In another example, a user may request a bookmark from a broadcast station using an SMS message, or through a web-based service. Further, a broadcast station server may send a whole set of bookmarks based on a user profile. In a further example, a user may use a web-based service to configure their bookmarks for DTE 10, and then update DTE 10 via OTA communications. In general, when DTE 10 receives a message that is recognized as a bookmark, it may automatically, or after user verification, store the bookmark in memory.

Figure 4:
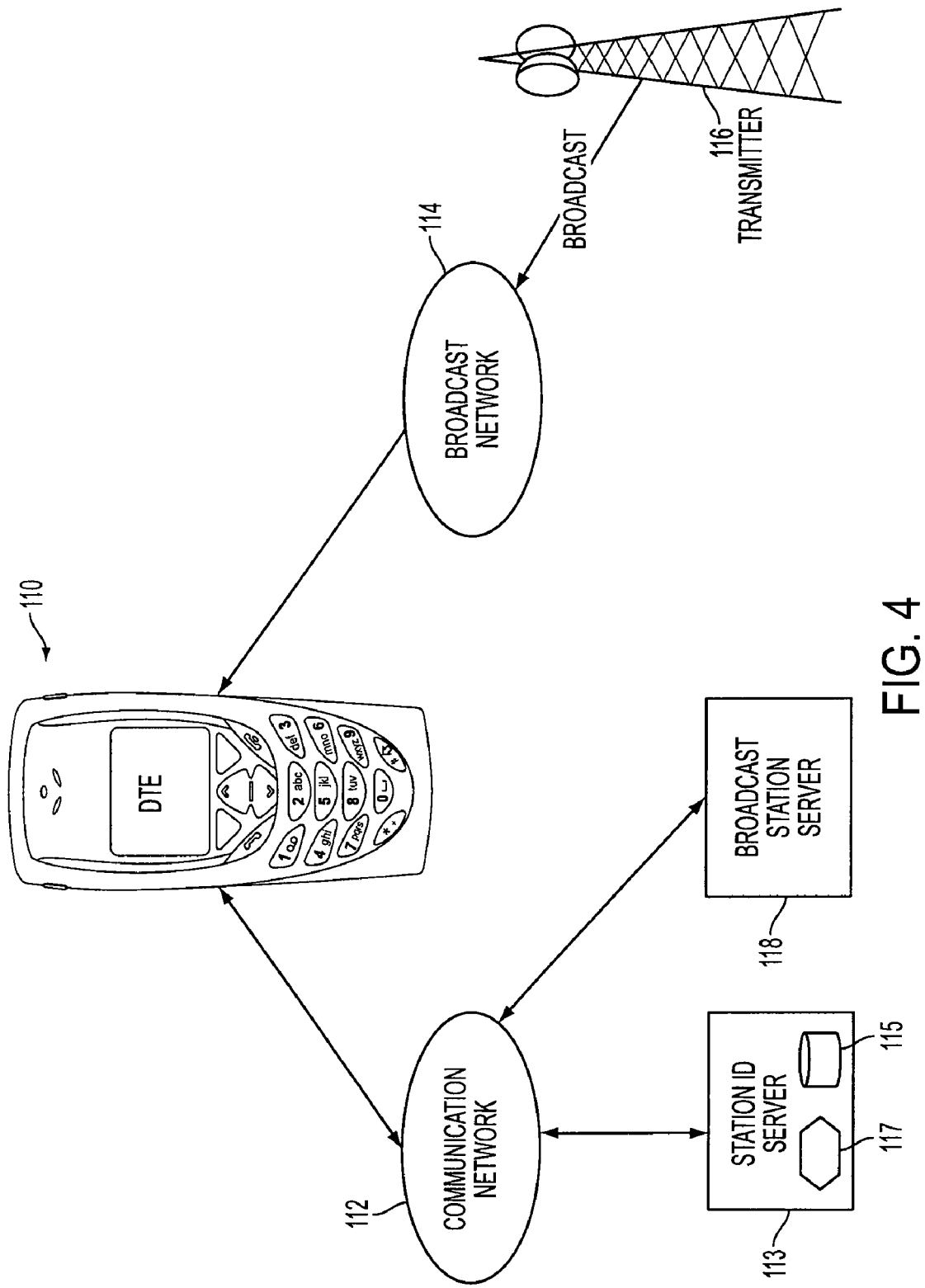
FIG. 4 shows a layout of another embodiment of a system according to the present invention including a mobile terminal device adapted to receive radio broadcasts and that is in communication with a network.
Figure 5:
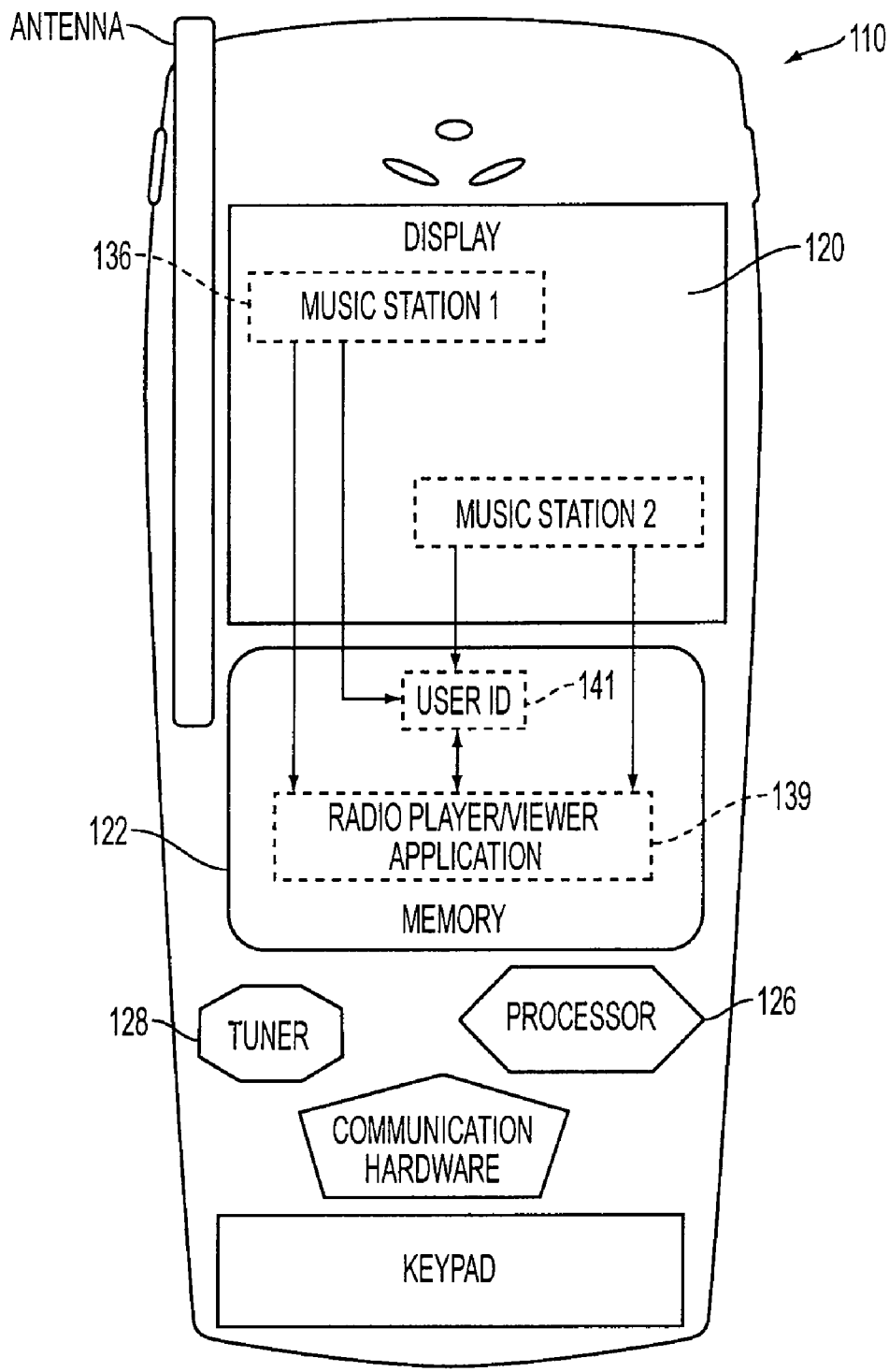
FIG. 5 shows a functional block diagram of the device of FIG. 4.

To provide further flexibility and further illustrate the use of parameters with bookmarks, another embodiment of the present invention, as shown in FIG. 4, includes a mobile data terminal (DTE) 110, a station id server 113, a broadcast station server 118, and a transmitter 116. The DTE 110 may be in communication with communication network 112 and broadcast network 114. The station id server 113 and broadcast station server 118 are generally in communication with communication network 112. The transmitter 116 broadcasts radio waves in broadcast network 114. The station id server 113 generally includes a server that identifies a broadcast station based on a bookmark selected and other parameters sent to the station id server. The station id server 113 generally includes a storage medium 115 and a processor 117 for processing instructions contained in the storage medium. For illustration purposes, suppose that the user shares DTE 110 with a family member and has therefore manually entered a unique user id that identifies the user and his bookmark preferences. Suppose further that the device 110 is generally configured as shown in FIG. 5, which is similar to DTE 10 in the previous embodiment except for differences and aspects discussed herein.

Accordingly, DTE 110 includes bookmark one 136 and bookmark two 137, which are stored in memory 122 and are graphically displayed on display 120. Each of the bookmarks 136, 137 point to a radio player/web site viewer application 139 and the parameter of a user id 141. The player/viewer application 139 according to one embodiment is a browser application running a Flash® or SMIL (Synchronized Multimedia Integration Language) plug-in. The application 139 may be included in the terminal's initial software suite, or it may be downloaded or otherwise installed on DTE 10. When bookmark one 136 is selected, it invokes application 139 and points it to the unique user id 141 stored in memory 122. The application 139, based on the bookmark selected and the user id 141, instructs the processor 126 to set up the DTE to receive a broadcast and connect with a web site for the selected bookmark and user id parameter. Thus, bookmarks may be uniquely configurable for different users of the same device.

Figure 6:
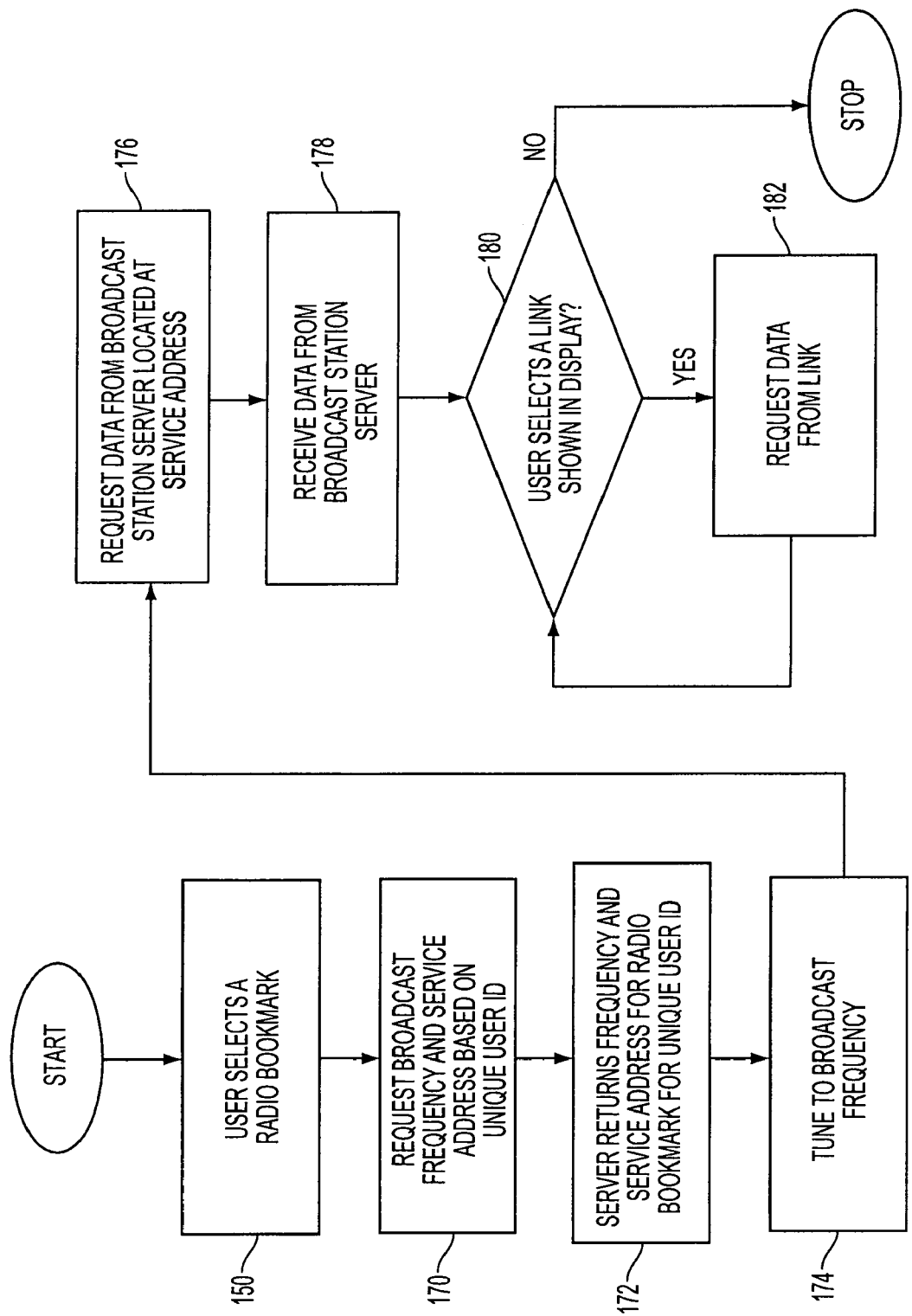
FIG. 6 shows a flow diagram for operation of the system of FIG. 4 in accordance with selection of a radio bookmark of the present invention.

Use of the present invention according to such an embodiment is generally illustrated in FIG. 6. The user starts the process in step 150 by selecting a radio bookmark, for example bookmark one 136, on the DTE 110. In response to selection of bookmark one 150, which invokes application 139, the processor 126 performs the step of sending 170 a request for radio broadcast frequency information and a network service address of a radio station broadcast station server 118 to the station id server 113. The request is related to a particular bookmark, such as bookmark one 136, and is based on related parameters, such as unique user id 141. The station id server 113 receives the request including the unique id parameter 141, determines the appropriate frequency information and network address information for bookmark one 136 and unique user id 141, and returns 172 the information to DTE 110 via the communication network 112. The DTE 110 thereafter tunes 174 the tuner 128 to receive the radio broadcast and requests 176 data from the broadcast station server 118 located at the network address returned. Server 118 preferably sends data associated with the radio station web site, which DTE 110 receives 178 via network 112. The user is therefore able to view the web site display for the server 118 and may select 180 a link shown on the web site display. In response to such a selection, the processor 126 requests 182 data associated with the selected link.

Figure 7:
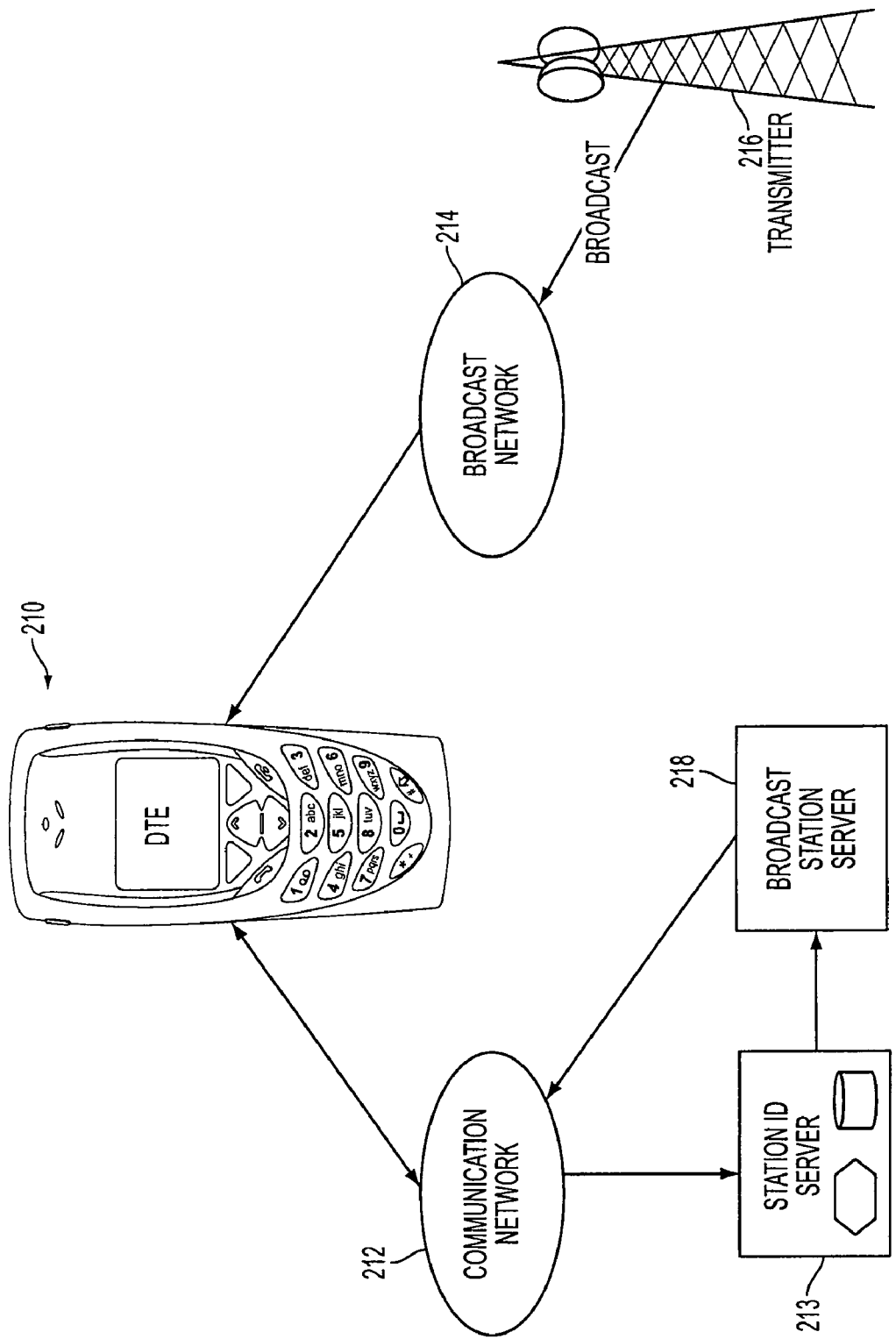
FIG. 7 shows a layout of a further embodiment of a system according to the present invention including a mobile terminal device adapted to receive radio broadcasts and that is in communication with a network.
Figure 8:
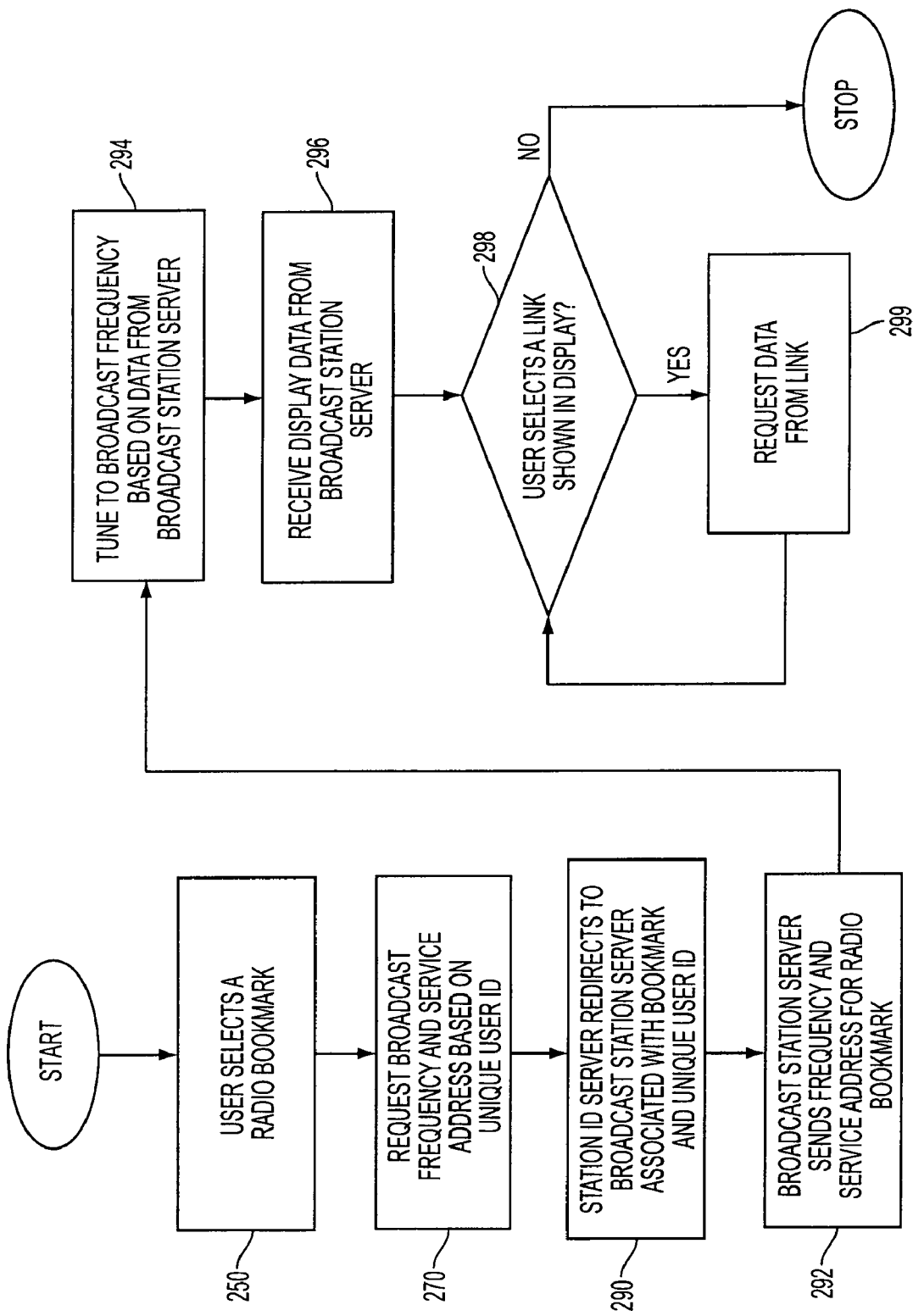
FIG. 8 shows a flow diagram for operation of the system of FIG. 7 in accordance with selection of a radio bookmark of the present invention.

Referring now to FIGS. 7 and 8, a further embodiment of the present invention is shown, which generally includes all aspects and preferences of the previous embodiment except with regard to message flows between DTE 210, station id server 213, and broadcast station server 218. Like numbers shown herewith, refer to like components, steps and features as previous embodiments. Accordingly, as a user selects 250 a radio bookmark on DTE 210, the processor receives the inputs and sends 270 a request to the station id server 213 via network 212. The request is likewise for broadcast information and a network address for server 218 for a radio station based on the bookmark selected and the parameter of a user's unique user id. The station id server 213 selects the appropriate radio station for the bookmark selected and parameters sent, and redirects 290 the request for the network address of server 218 to server 218 for the selected radio station. The broadcast station server 218 in turn sends 292 frequency information and the network address for its website to DTE 210.

After receiving frequency and network address information from server 218, the DTE 210 tunes 294 the tuner to receive the radio station broadcast. Preferably, included with the information sent from server 218 is web site data for the radio station's web site. Accordingly, as DTE 210 receives 296 the web site data it displays the web site information on DTE display. If the user then selects 298 a link from the web site display, DTE 210 sends 299 a request for data according to the link via network 212. The request for data associated with the link may be to a different server in communication with network 212 or to server 218.

While the present invention has been described in connection with the illustrated embodiments, it will appreciated and understood that modifications may be made without departing from the true spirit and scope of the invention. In particular, the invention applies to any computing device adapted to receive radio broadcasts and having data connectivity. Further, the radio broadcasts are not limited to FM radio, and may include analog or digital broadcasts.

We claim:

1. An apparatus comprising:
    a processor; and
    a storage medium configured with executable instructions that, if executed by the processor, cause the apparatus to:
        detect an operator input for selecting a bookmark stored in the storage medium;
        set up the apparatus to receive broadcast media associated with the bookmark from a broadcast media station;
        send a request to a broadcast station server via a data network for information related to the broadcast media station;
        send a request for a broadcast frequency to a station id server via the data network; and
        receive data indicative of the broadcast frequency;
    wherein setting up the apparatus and sending the request to the broadcast station server are both performed in response to the detection of the operator input for selecting the bookmark, and the data indicative of the broadcast frequency is received from the broadcast station server associated with the broadcast media station.

2. The apparatus of claim 1, wherein, if executed by the processor, the instructions further cause the apparatus to:
    receive information from the broadcast station server; and
    display the received information on a display of the apparatus.

3. The apparatus of claim 2, wherein the apparatus is configured to display the received information on the display while rendering the received broadcast media associated with the bookmark.

4. The apparatus of claim 1, wherein the bookmark comprises a radio bookmark, the broadcast media comprises a radio broadcast, and the broadcast media station comprises a radio station.

5. The apparatus of claim 1, wherein the apparatus comprises a mobile terminal device.

6. The apparatus of claim 1, wherein the broadcast media comprises analog broadcast media.

7. The apparatus of claim 1, wherein the broadcast media comprises digital broadcast media.

8. The apparatus of claim 1, wherein the bookmark comprises at least one parameter, and at least one of sending a request to a broadcast station server and sending a request to a station id server includes sending the at least one parameter.

9. The apparatus of claim 8, wherein the bookmark is programmable by a user of the apparatus.

10. The apparatus of claim 8, wherein the at least one parameter is selected from the group consisting of the broadcast frequency for the broadcast media station, a radio station call sign, a television station call sign, a unique user id, a unique apparatus id, user location information, and broadcast classification information.

11. The apparatus of claim 10, wherein the broadcast media comprises a radio broadcast and the broadcast classification information comprises a music category.

12. The apparatus of claim 1, wherein the request for information related to the broadcast media station is sent to the broadcast station server through a station id server that redirects the request to the broadcast station server.

13. The apparatus of claim 1, further comprising a command entry device, wherein the apparatus is configured to detect the user input for selecting the bookmark via the command entry device.

14. The apparatus of claim 13, wherein the command entry device includes a keypad.

15. The apparatus of claim 13, wherein the command entry device includes a graphical user interface.

16. An apparatus comprising:
    a processor; and
    a storage medium configured with executable instructions that, if executed by the processor, cause the apparatus to:
        detect an operator input for selecting a bookmark stored in the storage medium, the bookmark comprising at least one parameter;
        set up the apparatus to receive broadcast media associated with the bookmark from a broadcast media station;

send a request to a broadcast station server via a data network for information related to the broadcast media station;
send a request for a broadcast frequency to a station id server via the data network; and
receive data indicative of the broadcast frequency;
wherein:
setting up the apparatus and sending the request to the broadcast station server are both performed in response to the detection of the operator input for selecting the bookmark;
the data indicative of the broadcast frequency is received from the broadcast station server associated with the broadcast media station;
at least one of sending a request to a broadcast station server and sending a request to a station id server includes sending the at least one parameter;
the bookmark is programmable by a user of the apparatus;
the at least one parameter is selected from the group consisting of the broadcast frequency for the broadcast media station, a radio station call sign, a television station call sign, a unique user id, a unique apparatus id, user location information, and broadcast classification information; and
the unique user id comprises a username and a password.

17. An apparatus comprising:
a storage medium configured with executable instructions that, if executed by the processor, cause the apparatus to:
receive a request with a bookmark comprising at least one parameter from a data terminal device for broadcast frequency information of a broadcast station and a network address for a broadcast station server of the broadcast station;
determine a broadcast media station based on the at least one parameter received in the request;
send data indicative of the broadcast frequency information to the data terminal device after the broadcast media station has been determined based on the at least one parameter; and
send data indicative of the network address to the data terminal device after the broadcast media station has been determined based on the at least one parameter.

18. The apparatus of claim 17, wherein, if executed by the processor, the instructions further cause the apparatus to redirect the request to the broadcast station server associated with the broadcast station.

19. The apparatus of claim 17, wherein the at least one parameter is selected from the group consisting of the broadcast frequency for the broadcast media station, a radio station call sign, a television station call sign, a unique user id, a unique apparatus id, user location information, and broadcast classification information.

20. The apparatus of claim 19, wherein the broadcast media station is a radio station and the broadcast classification information comprises a music category.

21. The apparatus of claim 17, wherein the broadcast media station is a radio station.

22. An apparatus comprising:
a processor; and
a storage medium configured with executable instructions that, if executed by the processor, cause the apparatus to:
receive a request with a bookmark comprising at least one parameter from a data terminal device for broadcast frequency information of a broadcast station and a network address for a broadcast station server of the broadcast station;
determine a broadcast media station based on the at lest one parameter received in the request;
send data indicative of the broadcast frequency information to the data terminal device after the broadcast media station has been determined based on the at least one parameter; and
send data indicative of the network address to the data terminal device after the broadcast media station has been determined based on the at least one parameter;
wherein the at least one parameter is selected from the group consisting of the broadcast frequency for the broadcast media station, a radio station call sign, a television station call sign, a unique user id, a unique apparatus id, user location information, and broadcast classification information, and the unique user id comprises a username and a password.

23. A computer readable medium having computer-executable instructions to perform a method comprising:
detecting an operator input for selecting a bookmark stored in a storage medium of an apparatus;
setting up the apparatus to receive broadcast media associated with the bookmark from a broadcast media station;
sending a request to a broadcast station server for information related to the broadcast media station;
sending a request for a broadcast frequency to a station id server; and
receiving data indicative of the broadcast frequency from the broadcast station server associated with the broadcast media station;
wherein setting up the apparatus and sending the request to the broadcast station server are both performed in response to detecting the operator input selecting the bookmark.

24. The computer readable medium of claim 23, wherein, for detecting an operator input, the bookmark comprises at least one parameter, and sending the request to the broadcast station server for information related to the broadcast media station comprises sending the at least one parameter to the broadcast station server.

25. The computer readable medium of claim 24, wherein the at least one parameter is selected from the group consisting of the broadcast frequency for the broadcast media station, a radio station call sign, a television station call sign, a unique user id, a unique apparatus id, user location information, and broadcast classification information.

26. The computer readable medium of claim 23, wherein the broadcast media station comprises a radio station.

27. A computer readable medium having computer-executable instructions to perform:
receiving a request with a bookmark comprising at least one parameter from a data terminal device via a communication network for a broadcast frequency and a network address for a broadcast station server;
determining a broadcast media station based on the at least one parameter received in the request;
sending data indicative of the broadcast frequency to the data terminal device via the communication network after the broadcast media station has been determined based on the at least one parameter; and
sending data indicative of the network address to the data terminal device via the communication network after the broadcast media station has been determined based on the at least one parameter.

28. The computer readable medium of claim 27, wherein the computer-executable instructions are further configured to perform redirecting the request to the broadcast station server associated with the broadcast station.

29. The computer readable medium of claim 27, wherein the at least one parameter is selected from the group consisting of a broadcast frequency for the broadcast media station, a radio station call sign, a television station call sign, a unique user id, a unique apparatus id, user location information, and broadcast classification information.

30. A method comprising:
    detecting an operator input for selecting a bookmark stored in a storage medium of a terminal device;
    sending a request for a broadcast frequency to a station id server via a data network;
    receiving data indicative of the broadcast frequency from a broadcast station server associated with a broadcast media station;
    setting up the terminal device to receive broadcast media associated with the bookmark from the broadcast media station; and
    sending a request to a broadcast station server for information related to the broadcast media station;
    wherein setting up the terminal device and sending the request to the broadcast station server are both performed in response to detecting the operator input selecting the bookmark.

31. The method of claim 30, wherein, for detecting an operator input, the bookmark comprises at least one parameter, and sending the request to the broadcast station server for information related to the broadcast media station comprises sending the at least one parameter to the broadcast station server.

32. The method of claim 31, wherein the at least one parameter is selected from the group consisting of the broadcast frequency for the broadcast media station, a radio station call sign, a television station call sign, a unique user id, a unique apparatus id, user location information, and broadcast classification information.

33. The method of claim 30, wherein the broadcast media station comprises a radio station.

34. The method of claim 30, wherein, for detecting an operator input selecting the bookmark, the operator input is received via a command entry device of the terminal device.

35. The method of claim 34, wherein the command entry device includes a keypad.

36. The method of claim 34, wherein the command entry device includes a graphical user interface.

37. A method comprising:
    receiving a request comprising at least one parameter from a data terminal device via a communication network for a broadcast frequency and a network address for a broadcast station server;
    determining a broadcast media station based on the at least one parameter;
    sending data indicative of the broadcast frequency to the data terminal device after the broadcast media station has been determined based on the at least one parameter; and
    sending data indicative of the network address to the data terminal device after the broadcast media station has been determined based on the at least one parameter.

38. The method of claim 37, further comprising redirecting the request to the broadcast station server associated with the broadcast media station.

39. An apparatus comprising:
    a processor; and
    a storage medium configured with executable instructions that, if executed by the processor, cause the apparatus to:
        detect an operator input for selecting a radio bookmark;
        set a radio receiver to a frequency to receive a radio broadcast from a radio station associated with the radio bookmark;
        send a request to a radio station server via a data network for information related to the radio station, wherein the information is different from the radio broadcast;
        receive the information from the radio station server; and
        display the information on a display;
    wherein the radio bookmark is stored in the storage medium, the radio bookmark pointing to the frequency for receiving the radio broadcast for the radio station and pointing to the network address for the radio station server for the radio station.

40. The apparatus of claim 39, wherein the apparatus is configured to display the information on the display while receiving the radio broadcast associated with the radio bookmark.

* * * * *